United States Patent
Matsumoto et al.

(10) Patent No.: US 11,929,054 B2
(45) Date of Patent: Mar. 12, 2024

(54) SOUNDPROOF MATERIAL

(71) Applicant: MAXELL, LTD., Kyoto (JP)

(72) Inventors: Norikazu Matsumoto, Kyoto (JP); Shoko Sakai, Kyoto (JP); Kenji Ohtani, Kyoto (JP); Teruhisa Miyata, Kyoto (JP)

(73) Assignee: MAXELL, LTD., Kyoto (JP)

( * ) Notice: Subject to any disclaimer, the term of this patent is extended or adjusted under 35 U.S.C. 154(b) by 382 days.

(21) Appl. No.: 17/260,191

(22) PCT Filed: Jul. 26, 2019

(86) PCT No.: PCT/JP2019/029506
§ 371 (c)(1),
(2) Date: Jan. 13, 2021

(87) PCT Pub. No.: WO2020/026994
PCT Pub. Date: Feb. 6, 2020

(65) Prior Publication Data
US 2021/0272545 A1 Sep. 2, 2021

(30) Foreign Application Priority Data
Aug. 2, 2018 (JP) ................... 2018-146130

(51) Int. Cl.
*G10K 11/168* (2006.01)
*B32B 5/02* (2006.01)

(52) U.S. Cl.
CPC ............ *G10K 11/168* (2013.01); *B32B 5/022* (2013.01); *B32B 2307/102* (2013.01); *B32B 2307/732* (2013.01)

(58) Field of Classification Search
CPC . G10K 11/168; B32B 5/022; B32B 2307/102; B32B 2307/732
See application file for complete search history.

(56) References Cited

U.S. PATENT DOCUMENTS

| | | | | | |
|---|---|---|---|---|---|
| 4,056,161 | A | * | 11/1977 | Allen, Jr. | ............. G10K 11/168 181/290 |
| 2005/0126848 | A1 | * | 6/2005 | Siavoshai | ............. B60R 13/083 181/290 |

(Continued)

FOREIGN PATENT DOCUMENTS

| JP | 2004-294619 A | 10/2004 |
|---|---|---|
| JP | 2005-208494 A | 8/2005 |

(Continued)

OTHER PUBLICATIONS

International Search Report issued in corresponding International Patent Application No. PCT/JP2019/029506, dated Oct. 8, 2019, with English translation.

(Continued)

Primary Examiner — Forrest M Phillips
(74) Attorney, Agent, or Firm — Rimon P.C.

(57) ABSTRACT

An object of the present invention is to provide a soundproof material having a practically useful high-level sound absorption coefficient that while maintaining thinness, and further having an expanded sound-absorbable frequency region. A means for solving the problem is a soundproof material comprising: a surface cover layer composed of a fiber material; a back-surface layer laminated onto the surface cover layer, and composed of a porous material with voids interconnected with each other; and a joining layer laminated between the surface cover layer and the back-surface layer, and composed of a joining material, wherein the fiber material has an average fiber diameter of 1 to 10 μm and an air-permeation volume of 5 to 200 cm³/cm²·sec, and wherein the joining layer has a joint area percentage of 50 to 95% with respect to the entire surface where the surface cover layer and the back-surface layer face each other.

13 Claims, 1 Drawing Sheet

(56) References Cited

U.S. PATENT DOCUMENTS

| | | | |
|---|---|---|---|
| 2005/0217932 A1* | 10/2005 | Woodman | B60R 13/0815 |
| | | | 181/290 |
| 2006/0201741 A1 | 9/2006 | Inoue et al. | |
| 2006/0289231 A1* | 12/2006 | Priebe | B32B 3/266 |
| | | | 181/290 |
| 2007/0137926 A1* | 6/2007 | Albin | B60R 13/0815 |
| | | | 181/290 |
| 2008/0001431 A1* | 1/2008 | Thompson | B60R 13/08 |
| | | | 181/290 |
| 2016/0319538 A1* | 11/2016 | Pham | B32B 37/14 |
| 2017/0129145 A1* | 5/2017 | Wang | B29C 44/128 |
| 2020/0058282 A1 | 2/2020 | Ibayashi et al. | |

FOREIGN PATENT DOCUMENTS

| | | |
|---|---|---|
| JP | 2005-227747 A | 8/2005 |
| JP | 2006-028709 A | 2/2006 |
| JP | 2017-167251 A | 9/2017 |
| JP | 2018-092132 A | 6/2018 |

OTHER PUBLICATIONS

Transmittal of International Preliminary Report on Patentability issued in International Patent Application No. PCT/JP2019/029506, dated Feb. 11, 2021.

Translation of the Written Opinion of the International Searching Authority issued in International Patent Application No. PCT/JP2019/029506, dated Feb. 11, 2021.

Office Action issued in corresponding Japanese Application No. 2020-533499, dated Sep. 19, 2023, w/ English Translation (9 pages).

Office Action issued in corresponding Japanese Application No. 2020-533499, dated Apr. 4, 2023, w/ English Translation (9 pages).

* cited by examiner

SOUNDPROOF MATERIAL

CROSS REFERENCE TO RELATED APPLICATIONS

This application is the U.S. National Phase under 35 U.S.C. § 371 of International Application No. PCT/JP2019/029506, filed on Jul. 26, 2019, which claims the benefits of Japanese Application No. 2018-146130, filed on Aug. 2, 2018, the entire contents of which are hereby incorporated by reference.

TECHNICAL FIELD

The present invention relates to a soundproof material, and in particular relates to a soundproof material having a practically useful high-level sound absorption coefficient, and further having an expanded sound-absorbable frequency region.

BACKGROUND OF THE INVENTION

In recent years, it has become clear that people tend to live at high population densities in small areas due to the progress of urbanization or the efficiency of administrative services. As the population density increases, activities such as life, labor, and entertainment will be carried out in close proximity, and the frequency and types of noises that consumers will come into contact with will increase. In order to secure a comfortable living environment even in a noisy environment, a soundproof material is required which can generally block daily life noises that they encounter. Further, with miniaturization and lightening of various devices, thinning and lightening are required also required to soundproof materials used in them.

Daily life noises are emitted from, for example, transportation devices, construction machines/devices, electronic/electrical devices, home electrical appliances and the like, and there are diverse types, including sounds over a wide range of frequencies from low frequency to high frequency.

Sound absorption is one of the soundproofing methods for blocking out noises and abnormal sounds. Here, "sound absorption" refers to a method of suppressing sound reflection by absorbing sound, and the smaller the loudness of the sound reflected by absorption, the higher the sound absorption. The sound absorption mechanism is such that when sound is incident on a material composed of a skeleton part of fiber materials, such as felt, glass wool, and rock wool, and voids therebetween, part of energy of sound waves is converted into heat energy in the voids by friction with peripheral walls of the skeleton part, viscous resistance, vibration of the skeleton and the like, resulting in the sound being absorbed. In the sound, since sound energy consumption is maximized at a position where the particle velocity of sound waves is high, for example, if there is a sound absorbing material from a rigid wall to a position such as $\lambda/4$ where the particle velocity is high, the sound absorption coefficient is increased. Therefore, for example, in the material attached to the rigid wall, the higher the frequency, the higher the sound absorption coefficient. Also, the larger the thickness of the sound absorbing material, the more the sound absorption coefficient on the low frequency side can be increased.

Patent Document 1 discloses an ultra-lightweight soundproof material that prevents noise in an engine room of an automobile from propagating into a vehicle interior. This soundproof material comprises a laminated body in which a sound absorbing layer composed of an air-permeable material such as a thermoplastic felt and an air-permeable resonance layer composed of a lightweight foam body or a thin film body are bonded together by an adhesion layer so that it has a predetermined adhesive strength and an adhesive area.

In the soundproof material of Patent Document 1, by the use of the adhesion layer between the air-permeable resonance layer and sound absorbing layer, a resonance phenomenon is expressed at an interface between the air-permeable ultra-light resonance layer and sound absorbing layer, whereby the sound is absorbed. The spring-mass system resonance and rigidity are adjusted according to the bonding area and density of the sound absorbing layer to control the frequency and sound absorption coefficient of the sound absorbed at the interface. However, in this soundproof material, there is still room for improvement in the balanced control on the sound absorption coefficient in the low to high frequency regions (broadband sound absorption characteristics) and thinning, and it cannot be said that the sound-absorbable frequency region is sufficiently wide.

Patent Document 2 discloses a sound absorbing material suitable for the interior of an automobile and the like. The sound-absorbing material is a joined nonwoven fabric comprising a surface material composed of a thermoplastic synthetic long fiber nonwoven fabric by the spun-bond method, which was further subjected to calendering after partial thermal contact bonding, and a back surface material composed of a synthetic fiber nonwoven fabric.

The sound absorbing material of Patent Document 2 has a high sound absorption coefficient from a medium frequency region (2000 to 4000 Hz) by setting the average fiber diameter of the surface material to 10 to 30 µm, and further thickening the back surface material. However, when the total thickness of this sound absorbing material became thin, the sound absorption coefficient at 2000 Hz in particular tended to decrease. In other words, in the sound absorbing material of Patent Document 2, there is still room for improvement in the sound absorption coefficient in the frequency region below 2000 Hz when the thickness is made thinner in order to meet the increasing demand for thinning and lightening. Therefore, it cannot be said the sound-absorbable frequency region is sufficiently wide.

PRIOR ART DOCUMENTS

Patent Documents

Patent Document 1: JP 2005-208494 A
Patent Document 2: JP 2006-28709 A

SUMMARY OF THE INVENTION

Problem to be Solved by the Invention

The present invention solves the above conventional problems, and an object thereof is to provide a soundproof material having a practically useful high-level sound absorption coefficient while maintaining thinness, and further having an expanded sound-absorbable frequency region.

Means for Solving the Problem

As a result of intensive studies for solving the above problem, the present inventors found that a laminated body formed by partially joining a surface cover layer comprising a fiber material composed of fibers having a specific fiber diameter, and a back-surface layer composed of a porous material with voids interconnected with each other by a joining layer so that it has a predetermined joint area percentage, has a practically useful high-level sound absorption coefficient even if the total thickness of the laminated body is reduced, and is also useful as a soundproof material having an expanded sound-absorbable frequency range, thus completing the present invention.

The present invention provides a soundproof material comprising:
 a surface cover layer composed of a fiber material;
 a back-surface layer laminated onto the surface cover layer, and composed of a porous material with voids interconnected with each other; and
 a joining layer laminated between the surface cover layer and the back surface layer, and composed of a joining material, wherein the fiber material has an average fiber diameter of 1 to 10 μm and an air-permeation volume of 5 to 200 cm$^3$/cm$^2$·sec, and wherein the joining layer has a joint area percentage of 50 to 95% with respect to the entire surface where the surface cover layer and the back-surface layer face each other.

In one embodiment, the joining layer has a joint area percentage of 60 to 95% with respect to the entire surface where the surface cover layer and the back-surface layer face each other.

In one embodiment, the joining material is a coated pressure-sensitive adhesive or double-sided pressure-sensitive adhesive tape.

In one embodiment, the coated pressure-sensitive adhesive or double-sided pressure-sensitive adhesive has a shear storage elastic modulus in the range of $1.0 \times 10^4$ to $1.0 \times 10^6$ Pa at 25° C.

In one embodiment, the joining layer has a plurality of bar-like shaped layers.

In one embodiment, the plurality of bar-like shaped layers forms a stripe pattern.

In one embodiment, the distance between adjacent bar-like shaped layers is 1 mm or more.

In one embodiment, the surface cover layer has an air-permeation volume of 10 to 100 cm$^3$/cm$^2$·sec.

In one embodiment, the back-surface layer is a fiber material, and the fiber material has a basis weight of 100 to 300 g/m$^2$.

In one embodiment, the soundproof material has a total thickness of 5 to 15 mm.

In one embodiment, the soundproof material has a normal incidence sound absorption coefficient of 55% or more at all ⅓ octave band center frequencies 2000, 2500, 3150 and 4000 Hz as measured according to JIS A1405-2.

In one embodiment, the soundproof material has a normal incidence sound absorption coefficient of 55% or more at all ⅓ octave band center frequencies 1600, 2000, 2500, 3150 and 4000 Hz as measured according to JIS A1405-2.

In one embodiment, the soundproof material has a normal incidence sound absorption coefficient of 55% or more at all ⅓ octave band center frequencies 1250, 1600, 2000, 2500, 3150 and 4000 Hz as measured according to JIS A1405-2.

Effects of the Invention

Since the soundproof material of the present invention is thin, excellent in practicality, and has an expanded sound-absorbable frequency region, it is possible to effectively absorb various daily life noises.

DETAILED DESCRIPTION OF THE PREFERRED EMBODIMENTS

Embodiments of the present invention will hereinafter be described in detail with reference to the accompanying drawings.

[Structure of Soundproof Material]

Figure 1:
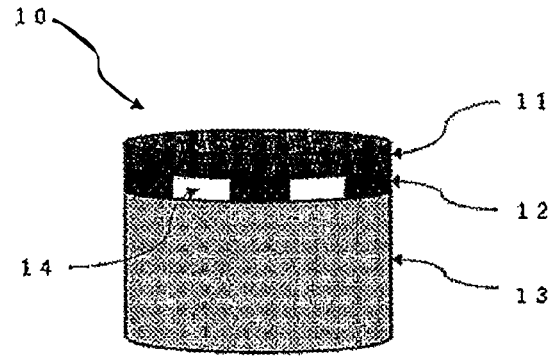
FIG. 1 is a perspective view schematically showing the structure of a soundproof material according to an embodiment of the present invention.

FIG. 1 is a perspective view schematically showing the structure of a soundproof material according to an embodiment of the present invention. A soundproof material 10 has a laminated structure including a surface cover layer 11 composed of a fiber material, a back-surface layer 13 and a joining layer 12 composed of a porous material with voids interconnected with each other. The soundproof material 10 is used as a member for absorbing sound emitted from sounding bodies such as transportation equipment, construction machinery/equipment, electronic/electrical equipment, and home electrical appliances.

<Joining Layer>

The joining layer 12 is a layer for joining the surface cover layer 11 and the back-surface layer 13. When the surface cover layer 11 and the back-surface layer 13 are laminated, a joining material is used between both the layers to form it so that it has a predetermined joint area percentage described below. Those materials which can easily and accurately realize the shape and dimensions, and have substantially no interconnected voids are used as the joining material.

For the joining material, for example, materials containing a pressure-sensitive adhesive, an adhesive, and the like may be used. Specific examples thereof include a coated pressure-sensitive adhesive, a coated adhesive, and those processed into a tape, a sheet, or a powder. Among them, from the viewpoint of workability, productivity, and dimensional accuracy, it is preferable that the joining layer 12 is formed with a coated pressure-sensitive adhesive or a double-sided adhesive tape (including a substrate-less double-sided adhesive tape having no substrate).

The pressure-sensitive adhesive used for the above coated pressure-sensitive adhesive or double-sided pressure-sensitive adhesive tape is not particularly limited, and a conventional, publicly known pressure-sensitive adhesive may be used. For example, it includes a rubber-based pressure-sensitive adhesive, an acrylic-based pressure-sensitive adhesive, a silicone-based pressure-sensitive adhesive, a urethane-based pressure-sensitive adhesive, a polyester-based pressure-sensitive adhesive, an ethylene-vinyl acetate copolymer-based pressure-sensitive adhesive and the like. Among these, a rubber-based pressure-sensitive adhesive or an acrylic-based pressure-sensitive adhesive is preferable from the viewpoints of versatility, a wide variable range in the thickness, not excessively constraining the surface cover layer and the back-surface layer, and the like. The shear storage elastic modulus (G') of the pressure-sensitive adhesive at 25° C. is preferably in the range of $1.0 \times 10^4$ to $1.0 \times 10^6$ Pa. By setting the shear storage elastic modulus within such a range, deformation and displacement of the surface cover layer 11 and the back-surface layer 13 due to sound vibrations are possible to some extent, sound waves can be passed through to some extent at the boundary layer without generating a hard portion that reflects sound, and therefore the sound absorption mechanism of the surface cover layer 11, the back-surface layer 13 and the soundproof material 10 as a whole can function without any problems. The shear storage elastic modulus (G') of the pressure-sensitive adhesive at 25° C. is preferably in the range of $5.0 \times 10^4$ to $8.0 \times 10^5$ Pa, and more preferably in the range of $1.0 \times 10^5$ to $6.0 \times 10^5$ Pa.

The above joining layer 12 has a function for joining and fixing the surface cover layer 11 and the back-surface layer 13 as described above. Here, the present inventors found that when the surface cover layer 11 composed of a specific fiber material and having a specific air-permeation volume, and the back-surface layer 13 composed of a porous material with voids interconnected with each other are used, if the surface cover layer 11 and the back-surface layer 13 are partially joined by the joining material, namely if they are joined so that the joint area percentage is in the range of 50 to 95% with respect to the entire surface where the surface cover layer 11 and the back surface layer 13 face each other, the frequency at which the normal incidence sound absorption coefficient becomes a maximum (sound absorption peak frequency) can be shifted in the low frequency direction, while, surprisingly, the normal incidence sound absorption coefficient is not drastically reduced, and, with respect to the sound absorption peak frequency, relatively large values are maintained also in the range on the low-frequency side and the range on the high-frequency side, even if the thickness of the soundproof material is thin by comparison with the conventional soundproof material. That is, the inventors found that the effect of expanding the sound-absorbable frequency range in practical usage is achieved.

The details of the mechanism that exerts the above effect are not clear, but it is inferred as follows. First, the sound absorption characteristics of the back-surface layer 13 composed of the porous material with voids interconnected with each other, which serves as the base, are such that the sound absorption coefficient increases as the frequency increases and reaches an almost constant value at a certain frequency, but its sound absorption coefficient is not overall high. On the other hand, the surface cover layer 11 composed of a fiber material with a structure having an average fiber diameter of 1 to 10 μm and an air-permeation volume of 5 to 200 $cm^3/cm^2 \cdot sec$ is a relatively dense structure, and therefore it has sound absorption characteristics in which a resonance type sound absorption mechanism and a porous type sound absorption mechanism are combined, and the area where the fiber and vibrating air (sound waves) come in contact with each other and the flow resistance also tend to become relatively larger, thus having the effect of increasing the sound absorption coefficient in the medium to high frequency ranges. Therefore, instead of joining the surface cover layer and the back-surface layer in this order by the joining layer from the side where the sound waves are made incident, if they are simply superposed, the sound absorption coefficient in the medium to high frequency ranges increases for the sound absorption characteristics of only the back-surface layer 13. However, the sound absorption coefficient in the frequency range below 2500 Hz remains low. Therefore, in order to increase the sound absorption coefficient in the frequency range below 2500 Hz, all the surfaces of the surface cover layer 11 and the back-surface layer 13 are joined by the joining layer 12 such as a pressure-sensitive adhesive, and when the sound absorption peak frequency is shifted in the low frequency direction using a membrane-oscillation-type sound-absorbing mechanism at the joint interface, the sound absorption peak frequency is certainly shifted in the low frequency direction, and the sound absorption coefficient near the sound absorption peak frequency also increases, however the sound absorption coefficient in the high frequency range decreases to the contrary. In the present invention, instead of joining all the surfaces of the surface cover layer 11 and the back-surface layer 13 by the joining layer 12, by providing the joining layer 12 with openings 14 so that it has a relatively large aperture ratio, sound waves transmitted without being absorbed in the surface cover layer 11 are allowed to permeate the back-surface layer 13 composed of the porous material with voids interconnected with each other, whereby the permeated sound waves are transmitted to the skeleton of the back-surface layer 13, vibrated therethrough, and the sound energy can be efficiently converted into heat energy. Therefore, the above decreased sound absorption coefficient in the high frequency range can be increased. In particular, when the pressure-sensitive adhesive having viscoelasticity serves as the joining layer 12, since the surface cover layer 11 and the back-surface layer 13 are not excessively constrained, deformation and displacement of the surface cover layer 11 and the back-surface layer 13 due to sound vibrations are possible to some extent, sound waves can be passed through to some extent without generating a hard portion that reflects sound at the boundary layer, and the sound absorption mechanism of the surface cover layer 11, the back-surface layer 13 and the soundproof material 10 as a whole can function without any problems. Furthermore, by providing such openings 14, a laminated structure portion having the joining layer 12 and the back-surface layer 13 and the openings 14 can be grasped as a type of sound-absorbing layer having a Helmholtz resonator-type sound absorbing mechanism including a porous material (back-surface layer 13) with voids interconnected with each other directly bonded, in place of an air layer, on the back of a perforated viscoelastic membrane (joining layer 12) with a total aperture ratio (aperture ratio=100%−joint area percentage) of the air-permeable openings 14 of 5 to 50%. Therefore, the function of shifting the sound absorption peak frequency to the low frequency side can be maintained to some extent. Increasing the joint area percentage of the joining layer 12 means that the surface density of the joining layer 12 increases and the aperture ratio of the joining layer decreases. If the surface density increases, it is considered that the peak sound absorption frequency is shifted in the low frequency direction based on the membrane oscillation-type mechanism and the resonator type sound absorption mechanism.

As the results above, it is presumed that, in the soundproof material 10 of the present invention, the respective sound absorption mechanism are synergistically expressed, so that it has a practically useful high-level sound absorption coefficient even if the total thickness of the soundproof material 10 is thin, and achieves the effect of expanding the sound-absorbable frequency range has been achieved.

In the soundproof material 10 of the present invention, the above joint area percentage is in the range of 50 to 95%, preferably in the range of 60 to 95%, and more preferably in the range of 65 to 95% with respect to the entire surface where the surface cover layer 11 and the back-surface layer 13 face each other. If the joint area percentage is less than 50%, the sound absorption coefficient of the soundproof material in the frequency range below 2000 Hz may decrease. On the other hand, if the joint area percentage is more than 95%, the sound absorption coefficient of the soundproof material 10 in the high frequency range, for example, the sound absorption coefficient exceeding 3150 Hz may decrease. In the soundproof material 10 of the present invention, in the range where the joint area percentage of the joining layer 12 is 50 to 95%, even if the total thickness of the soundproof material 10 is constant, the frequency of the sound absorption peak may be shifted in the low frequency direction by increasing the joint area.

The shape of the joining layer 12 is not particularly limited as long as air-permeable openings 14 are formed in a part of a contact surface so that the joint area percentage is in the range of 50 to 95% with respect to the entire surface where the surface cover layer 11 and the back-surface layer 13 face each other, that is, the total aperture ratio of the air-permeable openings 14 is in the range of 5 to 50%. For example, it includes a linear shape, a dot shape, a punching sheet shape (a shape with a hole in the sheet), and the like. It is preferable that the plural air-permeable openings 14 are formed in the entire contact surface uniformly.

Figure 2:
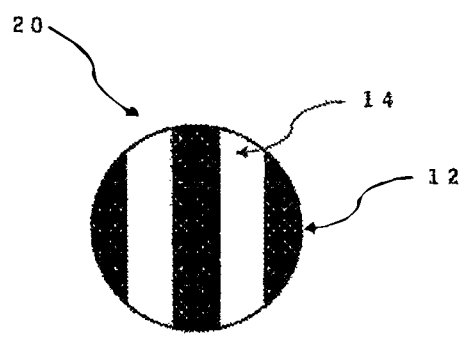
FIG. 2 is a horizontal cross-sectional view schematically showing an example of the structure of a joining layer of the present invention.

FIG. 2 is a horizontal cross-sectional view schematically showing an example of the structure of the joining layer of the present invention. In one preferred embodiment, from the viewpoint of workability and processability, the joining layer 12 is, for example, a plurality of bar-like shaped layers. A bar-like shaped layer means a linear layer having a predetermined width. When the joining layers that have bar-like shapes are uniformly formed on the entire surface where the surface cover layer 11 and back-surface layer 13 face each other, the plurality of bar-like shaped layers forms a striped pattern. The striped pattern is a marking of lines in which straight lines are arranged in parallel at regular intervals. As a result, the air-permeable opening 14 is formed between two adjacent bar-like shaped layers.

The width of the bar-like shaped layer is appropriately determined in consideration of the size of soundproof material used, the number of bar-like shaped layers, and the like besides the above joint area percentage and the desired sound absorbing characteristics, but preferably it is 1 mm or more. If the width of the bar-like shaped layer is less than 1 mm, it may be difficult to accurately maintain and process the shape and dimensions. On the other hand, the upper limit of the width of the bar-like shaped layer is not particularly limited as long as the effect of the present invention is not hindered, but it is preferably set so that in a sample to be subjected to the measurement of the normal incidence sound absorption coefficient (diameter: 28.8 mm), it has a plurality of openings 14, for example 14 mm or less. The plurality of bar-like shaped layers may have the same or different widths.

The distance between the adjacent bar-like shaped layers is appropriately determined in consideration of the size of soundproof material used, the number of bar-like shaped layers and the like, besides the above joint area percentage and the sound absorbing characteristics, but preferably it is 1 mm or more. If the distance between the adjacent bar-like shaped layers is less than 1 mm, it may be difficult to accurately maintain and process the shape and dimensions, or the adjacent bar-like shaped layers may come into contact with each other and an opening may not be formed. On the other hand, the upper limit of the distance between the adjacent bar-like shaped layers is not particularly limited as long as the effect of the present invention is not hindered, but it is preferably set so that in a sample to be subjected to the measurement of the normal incidence sound absorption coefficient (diameter: 28.8 mm), it has a plurality of openings 14, for example 6 mm or less. The plurality of bar-like shaped layers may have the same or different distances.

The thickness of the joining layer 12 is not particularly limited as long as it does not interfere with the effects of the present invention, but it is preferably in the range of 0.025 to 3 mm. If the thickness of the joining layer 12 is less than 0.025 mm, the sound absorption coefficient of the soundproof material 10 may overall decrease, or the joining strength between the surface cover layer 11 and the back-surface layer 13 may decrease. On the other hand, if the thickness of the joining layer exceeds 3 mm, when the joint area is large, the sound absorption coefficient in the high frequency range may decrease. Also the thickness and weight of the soundproof material 10 become large, which is inappropriate for thinning and lightening purposes. Furthermore, the density of the joining layer 12 is not particularly limited as long as the effect of the present invention is not hindered, but it is preferably in the range of 1.0 to 1.5 g/cm$^3$ from the viewpoint of lightening.

In general, in the soundproof material composed only of a porous material such as glass wool, the sound absorption coefficient increases as the frequency increases and reaches an almost constant value at a certain frequency, but by increasing its thickness, the sound absorption coefficient in the frequency range of 2000 to 4000 Hz (medium to high frequency ranges) is increased with also a concomitant increase in the sound absorption coefficient in the frequency range below 2000 Hz (from the medium to low frequency ranges) to some extent, it is possible to expand the frequency range that is useful for the sound absorbing material. That is, the useful sound absorption frequency range is controlled by controlling the thickness of the soundproof material. However, in such a control method, if the space for attaching the soundproof material is limited, or if the soundproof material is desired to be made thinner or more lightweight, there occurs a problem that the desired design (for example, compatibility between thinning/lightening and expansion of the useful sound absorption frequency range) is not sufficiently satisfied. As described above, the soundproof material 10 of the present invention can expand the sound absorption frequency range that is useful for the sound absorbing material by controlling the joint area percentage of the above joining layer 12 in the range of 50 to 95% when the total thickness of the soundproof material 10 is the same. Therefore, it is possible to provide a useful solution to the above problem. Then, by using the specific surface cover material 11 in combination described below, the sound absorption frequency range that is useful for the sound absorbing material can be expanded even when the total thickness of the soundproof material 10 is made thinner than that of conventional products.

<Surface Cover Layer>

The fiber material of the surface cover layer 11 has an average fiber diameter in the range of 1 to 10 μm and an air-permeation volume in the range of and 5 to 200 cm$^3$/cm$^2$·sec. The fiber material refers to a material whose shape is supported by fibers, which has a space between fibers, and through which gas can pass. The fiber material is preferably in the form of a sheet. Non-woven fabrics, woven fabrics and knitting are included in the fiber material here. On the contrary, resin foams or resin film materials are not included in the fiber material here even if they are air-permeable materials. The average fiber diameter of fibers here means the one obtained by taking a photograph with a magnification of 500 times with a microscope, measuring the length of 100 fibers in the diameter direction with a scale, calculating their average value, and rounding off one digit after the decimal point.

By respectively setting the average fiber diameter and air-permeation volume of the fibers constituting the surface cover layer 11 in the above ranges, it becomes easier for the fiber material of the surface cover layer 11 to have a relatively dense structure, and a sound absorbing effect which is like combining a resonance type sound absorbing mechanism and a porous type sound absorbing mechanism, namely it has the effect of increasing the sound absorption coefficient in the medium to high frequency ranges. Together with this, it is also possible to make a concomitant increase in the sound absorption coefficient in the frequency range below 2000 Hz (from the medium to low frequency ranges) to some extent. Therefore, as described above, when the surface cover layer 11 is joined onto the back-surface layer 13 through the joining layer 12, the sound absorption coefficient on the high frequency range side tends to be reduced, accompanied by the increase of the joint area percentage of the laminated portion between the joining layer 12 and the back-surface layer 13. However, the characteristics of the surface cover layer 11 can also cover this phenomenon, and as a result, the soundproof material 10 of the present invention can achieve the effect of expanding the sound-absorbable frequency range in practical usage, even if the thickness is thin.

In the present embodiment, the fiber material of the surface cover layer 11 is not particularly limited, but it is preferable to use a nonwoven fabric composed of synthetic fibers. Examples of the fibers constituting the non-woven fabric that can be used include thermoplastic synthetic fibers, such as polyolefin-based fibers such as polyethylene, polypropylene and copolymerized polypropylene; polyamide-based fibers such as nylon 6, nylon 66 and copolymerized polyamide; polyester-based fibers such as polyethylene terephthalate, polybutylene terephthalate, copolymerized polyester and aliphatic polyester; acrylic-based fiber; aramid fiber; composite fibers such as a core sheath structure in which the sheath is composed of polyethylene, polypropylene or copolymerized polyester, and the core is composed of polypropylene or polyester, and the like; biodegradable fibers such as polylactic acid, polybutylene succinate and polyethylene succinate, and the like. These fibers may be used alone or in combination of two or more, and may also be used by mixing or laminating modified cross-section fibers such as flat yarns, crimp fibers, divided fibers, and the like. Among these, polyester-based fibers are particularly preferable from the viewpoints of versatility, heat resistance, flame resistance and the like.

The average fiber diameter of fibers constituting the fiber material of the surface cover layer 11 is in the range of 1 to 10 μm, preferably in the range of 2 to 9 μm, and more preferably in the range of 2 to 6 μm. The fiber diameter of fibers constituting the surface cover layer 11 is made to have a structure with small voids, and in order to increase the sound absorption coefficient in the medium to high frequency ranges and also to concomitantly increase the sound absorption coefficient in the frequency range below 2000 Hz (from the medium to low frequency ranges), it is preferably made small as much as possible. The fiber diameters of the fibers constituting fiber material may be the same or different. When the fiber diameters are different, thick fibers having an average fiber diameter of μm or more and fine fibers having an average fiber diameter of less than 10 μm are, for example, mixed so that the average fiber diameter is 1 to 10 μm, and they may be employed as a fiber material. If the average fiber diameter of fibers constituting the fiber material is less than 1 μm, the strength, rigidity, handling easiness and the like may decrease, and furthermore, it may be disadvantageous in terms of the price. On the other hand, if the above average fiber diameter exceeds 10 μm, the sound absorption coefficient in the medium to high frequency ranges is decreased, with also a possible decrease in the sound absorption coefficient in the frequency range below 2000 Hz (from the medium to low frequency ranges).

The air-permeation volume of the surface cover layer 11 is in the range of 5 to 200 $cm^3/cm^2 \cdot sec$, preferably in the range of 10 to 100 $cm^3/cm^2 \cdot sec$, and more preferably in the range of 20 to 80 $cm^3/cm^2 \cdot sec$. If the air-permeation volume of the surface cover layer 11 is less than 5 $cm^3/cm^2 \cdot sec$, the sound absorption coefficient in the medium to high frequency ranges may decrease. On the other hand, if the air-permeation volume of the surface cover layer 11 exceeds 200 $cm^3/cm^2 \cdot sec$, the sound absorption coefficient in the frequency range below 2000 Hz (the medium to low frequency ranges) may decrease.

The thickness of the surface cover layer 11 is preferably in the range of 0.01 to 5 mm, more preferably in the range of 0.05 to 4 mm. The basis weight of the surface cover layer 11 is preferably in the range of 5 to 300 $g/m^2$, more preferably in the range of 15 to 100 $g/m^2$. Furthermore, the average apparent density of the surface cover layer 11 is preferably in the range of 0.01 to 1.0 $g/cm^3$, and more preferably in the range of 0.02 to 1.0 $g/m^3$.

By configuring the thickness, average apparent density, and basis weight of the surface cover layer 11 in such a manner, the sound energy of sound waves transmitted through the fiber material can be more efficiently consumed by air friction in a vicinity portion of the entrance of voids and viscous friction with an inner wall of a fiber skeleton part. If the thickness of the surface cover layer 11 is less than 0.01, the average apparent density is less than 0.01 $g/cm^3$, and the basis weight is less than 5 $g/m^2$, the strength, rigidity, fiber density, and the like decrease, and the handling easiness and sound absorption effect may decrease. On the other hand, if the thickness of the surface cover layer 11 exceeds 5 mm, the average apparent density exceeds 1.0 $g/m^3$, and the basis weight exceeds 300 $g/m^2$, the strength and fiber density increase, but the rigidity is too high, so that cutting easiness, and handling easiness may deteriorate. Also, it is inappropriate for thinning and lightening purposes.

A method for producing the fiber material of the surface cover layer 11 is not particularly limited, and it includes conventional, publicly known methods for producing a nonwoven fabric by a wet method, a dry method or direct spin-drawing (spunbond, meltblown, and the like), and the like. Among these, from the viewpoints of the strength of fiber material, handling easiness, and uniformity of voids, for example, a production method for a warp weft orthogonal nonwoven fabric in which warps and wefts are arranged almost mutually orthogonal or a production method for a nonwoven fabric in which warps are oriented in only one direction, or a production method for a nonwoven fabric in which thick fibers and fine fibers are interfiber bonded between the fibers by a binder is preferable, but these are merely one example, and the present invention is not limited thereto.

The warp weft orthogonal nonwoven fabric is produced by first drawing fibers directly spun from the raw material resin, then processing and preparing them into two types of webs in which fibers are arranged in the respective warp and weft directions, then stacking the two types of webs so that the arranged fibers are orthogonal to each other, and joining them by point thermal bonding with thermal embossing. Besides thermal embossing, the method for stacking warp and weft webs include a method of impregnation adhesion with an emulsion, and a method in which short fibers are entwined with a water jet to combine and integrate them. Similarly, a nonwoven fabric in which fibers are arranged only in the warp direction can be produced, and this nonwoven fabric may serve as the fiber material. Different from nonwoven fabrics produced by the conventional spunbond method, in the nonwoven fabric produced by such a method in which predrawn ultrafine fibers having an average fiber diameter of several μm are arranged in the respective warp and weft directions or the warp direction. Therefore, the deformation when a load is applied is small and the shape can be maintained, so that secondary processing (roll-to-roll processing) or the like that requires tension can be easily conducted even if it has a low basis weight. The tensile strength of these nonwoven fabrics (according to ASTM D882) is preferably in the range of 20 to 300 N/50 mm in the MD direction.

The non-woven fabric in which thick fibers and thin fibers are interfiber bonded by a binder is produced first, for example, by melt-spinning or wet-spinning fibers having different fiber diameters from the above raw material resin such as polyester, cutting them into flocs having a fiber length of 10 mm or less, preparing a suspension obtained by mixing them with fibers of the polyvinyl alcohol-based fibers that serve as a binder, and uniformly dispersing them, followed by a usual paper-making method. The fibers having different fiber diameters may be the same material or different materials. When making a sheet, other than the above-mentioned papermaking method that is a wet method, a dry method in which short fibers are sheeted by a card machine and a webber (air-laid method) using an air flow may be used. The fiber arrangement may be either cross or random.

<Back-Surface Layer>

The above back-surface layer 13 is composed of a porous material with voids interconnected with each other. The porous material with voids interconnected with each other is not limited as long as it is used as the sound absorbing material, but includes felt, a fiber material such as a nonwoven fabric composed of synthetic fibers (including a mixture of synthetic fibers by needle punching or felt made of 100% synthetic fibers), a foam material having open cells and the like.

The above fiber material includes those in which, for example, cotton, wool, wood wool, waste fiber, and the like are processed into a felt shape with a thermosetting resin (generic name: resin felt); synthetic fiber felts such as polyester fiber felts such as polyethylene terephthalate, nylon fiber felt, polyethylene fiber felt, polypropylene fiber felt, acrylic fiber felt, composite fiber felt having a core/sheath structure in which the sheath is composed of polyethylene, polypropylene or copolymerized polyester, and the core is composed of polypropylene or polyester, and the like, and biodegradable fiber felts such as polylactic acid, polybutylene succinate and polyethylene succinate; inorganic fiber felts such as silica-alumina ceramic fiber felt, silica fiber felt, glass wool, and rock wool long fiber. The foam material having open cells includes, for example, polyurethane foam, polyethylene foam, polypropylene foam, phenol foam, melamine foam; those in which rubbers such as nitrile butadiene rubber, chloroprene rubber, styrene rubber, silicone rubber, urethane rubber, EPDM and the like are foamed in interconnected open cells, or those in which after foaming them, they are subjected to crushing processing or the like, and the foam cells are perforated, and formed in interconnected open cells, and the like. Among these, synthetic fiber felt is preferable from the viewpoint of versatility, and polyester fiber felt is more preferable from the viewpoint of heat resistance, flame resistance and the like.

When the fiber material is used as the back-surface layer 13, the average fiber diameter of fibers constituting the fiber material is preferably in the range of 10 to 30 μm. The thickness of the fiber material is preferably in the range of 5 to 15 mm. The average fiber diameter of fibers constituting the fiber material used in the back-surface layer 13 can be obtained by the same method as that of the average fiber diameter of fibers constituting fiber material used in the surface cover layer 11. Further, the basis weight of the fiber material is preferably in the range of 50 to 1500 g/m$^2$, more preferably in the range of 100 to 300 g/m$^2$, and particularly preferably in the range of 200 to 280 g/m$^2$. Furthermore, the average apparent density of the fiber material is preferably in the range of 0.01 to 0.1 g/cm$^3$.

When the foam material having open cells is used as the above back-surface layer 13, the thickness of the foam material is preferably in the range of 5 to 15 mm. The basis weight of the foam material is preferably in the range of 50 to 4500 g/m$^2$, more preferably in the range of 100 to 2000 g/m$^2$, and particularly preferably in the range of 100 to 1000 g/m$^2$. The average apparent density of the foam material is preferably in the range of 0.01 to 0.3 g/cm$^3$.

By composing the back-surface layer 13 of the above-described fiber material or of the foam material having open cells, sound waves transmitted without being absorbed by the fiber material of the surface cover layer 11 are efficiently transmitted to the fiber material or the foam material having open cells of the back-surface layer 13, and a part of sound wave energy can be converted into heat energy by friction with a peripheral wall of a skeleton part, viscous resistance, vibration of the skeleton and the like. In the back-surface layer 13, if the average fiber diameter, thickness, basis weight and average apparent density of fibers of the fiber material are less than the above ranges, the sound absorption coefficient may decrease overall. On the other hand, if the average fiber diameter, thickness, basis weight and average apparent density of fibers of the fiber material exceed the above ranges, it is inappropriate for thinning and lightening purposes. Similarly, if the thickness, basis weight and average apparent density of the foam material having open cells are less than the above ranges, the sound absorption coefficient may decrease overall. On the other hand, if the thickness, basis weight and average apparent density of the foam material having open cells exceed the above ranges, it is inappropriate for thinning and lightening purposes.

The air-permeation volume of the back-surface layer 13 is not particularly limited, but it is preferably equal to or higher than the air-permeation volume of the surface cover layer 11 and specifically, it is preferably in the range of 5 to 1000 cm$^3$/cm$^2$·sec, and more preferably in the range of 100 to 300 cm$^3$/cm$^2$·sec. If the air-permeation volume of the back-surface layer 13 is less than 5 cm$^3$/cm$^2$·sec, the sound absorption coefficient of the soundproof material 10 may decrease overall. On the other hand, if the air-permeation volume of the back-surface layer 13 exceeds 1000 cm$^3$/cm$^2$·sec, handling easiness and mechanical strength may deteriorate. By configuring the air-permeation volume of the back-surface layer 13 like this, the sound waves transmitted without being absorbed by the fiber material of the surface cover layer 11 are efficiently transmitted to the fiber material or the foam material having open cells of the back-surface layer 13, and a part of sound wave energy can be converted into heat energy by friction with a peripheral wall of the skeleton part, viscous resistance, vibration of the skeleton and the like.

The method for producing the synthetic fiber felt used in the back-surface layer 13 is not particularly limited, and includes conventional, publicly known production methods. Specifically, the above-mentioned synthetic fibers are defibrated and mixed by a dry method (carding method or air-laid method) and formed into layered, laminated felt-like mats by a felt sorter, interlayer stitched by a needle punch method in order to retain the shape of the felt and to prevent layered delamination thereof, thereby being able to obtain synthetic fiber felt. Other than the needle punch method, interlayer stitching and interfiber bonding may be conducted using a chemical bond method, a thermal bond method, a water flow entanglement method, or the like.

The method for producing the foam material having open cells used in the back-surface layer 13 is not particularly limited, and examples thereof include conventional, publicly known production methods. For example, a urethane foam material can be obtained by mixing a polyisocyanate and a polyol with a catalyst, a foaming agent, a foam stabilizer, and the like, and simultaneously conducting a foaming reaction and a resin making reaction. In addition, an open cell polyolefin-based foam material can also be obtained by a method in which a closed-cell type polyolefin-based foam material is produced in advance, on which compression processing is conducted in which the foam material is passed through gaps between two rolls rotating in different directions so as to be compressed, thereby rupturing cell membranes.

<Soundproof Material>

The soundproof material 10 of the present invention is obtained by joining the surface cover layer 11 composed of the fiber material and the back-surface layer 13 composed of the porous material with voids interconnected with each other by the joining layer 12. As described above, the method of joining the surface cover layer 11 and the back-surface layer 13 is preferably a method in which both the layers are laminated by using a coated pressure-sensitive adhesive or double-sided adhesive tape (including a substrate-less double-sided adhesive tape having no substrate) so as to have a predetermined joint area percentage. Specifically, a double-sided adhesive tape slit to a predetermined width (including a substrate-less double-sided tape), a punched double-sided tape, or a sheet in which a pressure-sensitive adhesive is coated in stripes or dots, or the like is laminated or transferred onto either the surface cover layer 11 or the back-surface layer 13 so that the joining layer 12 has a predetermined joint area percentage, and thereafter both the layers may be contact bonded/joined. The contact bonding of the surface cover layer 11 and the back-surface layer 13 can be conducted in an environment at normal temperature without heating. However, if necessary, the contact bonding may be conducted while heating.

The thickness of the soundproof material 10 of the present invention is preferably in the range of 5 to 23 mm, and more preferably in the range of 5 to 15 mm from the viewpoint of achieving thinning and lightening, while ensuring sound absorption characteristics. If the thickness of the soundproof material 10 is less than 5 mm, the sound absorption coefficient may decrease overall. On the other hand, if the thickness of the soundproof material 10 exceeds 23 mm, it is inappropriate for thinning and lightening purposes.

The soundproof material 10 of the present invention has a normal incidence sound absorption coefficient of preferably 55% or more at all ⅓ octave band center frequencies 2000, 2500, 3150 and 4000 Hz, more preferably 55% or more at all ⅓ octave band center frequencies 1600, 2000, 2500, 3150 and 4000 Hz, and particularly preferably 55% or more at all ⅓ octave band center frequencies 1250, 1600, 2000, 2500, 3150, and 4000 Hz as measured according to JIS A1405-2.

The sound absorption coefficient of the soundproof material in the medium frequency region (2000 to 4000 Hz) can be improved by increasing the thickness of the soundproof material and by increasing the average apparent density of the surface material, which, on the other hand cause, problems such as high cost, and becoming bulky. In the present invention, with the thickness, contact area and the like of the soundproof material in the above ranges, a soundproof material excellent in winding workability, cutting workability and handling easiness such as during stacked packaging or transportation, while extensively securing a wide sound-absorbable frequency region.

EXAMPLES

The present invention will be described more specifically by the following Examples, however the present invention is not limited by these. The respective characteristic values were measured by the following methods.

(1) Sound Absorption Coefficient

Using an acoustic impedance tube (inner diameter: 29.0 mm) according to JIS A 1405-2, the normal incidence sound absorption coefficient was measured in the ⅓ octave band center frequency range of 1000 to 4000 Hz. Specifically, the normal incidence sound absorption coefficient at 1000, 1250, 1600, 2000, 2500, 3150, and 4000 Hz was measured. The measurement was conducted in close contact with a rigid wall without a back air layer. The judgment as to whether or not it was practically useful for the soundproof material was evaluated according to the following criteria.

| | |
|---|---|
| A: | Normal incidence sound absorption coefficient is 55% or more at all ⅓ octave band center frequencies 1600, 2000, 2500, 3150 and 4000 Hz. |
| B: | Normal incidence sound absorption coefficient is 55% or more at all ⅓ octave band center frequencies 2000, 2500, 3150 and 4000 Hz. |
| C: | Normal incidence sound absorption coefficient is 55% or more at any of ⅓ octave band center frequencies 2000, 2500, 3150 and 4000 Hz. |

(2) (Average Fiber Diameter)

A photograph with a magnification of 500 times was taken with a microscope, 100 fibers were arbitrarily selected, their average value was calculated, and one digit after the decimal point was rounded off to obtain their average fiber diameter.

(3) Air Permeation Volume

It was measured by a Frazier type air permeability tester in accordance with JIS L 1096. For the Frazier type air permeation tester, DAP-360 (product model number) manufactured by DAIEI KAGAKU SEIKI MFG. co., ltd. was used. The measurement conditions were a differential pressure of 125 Pa, and a measurement hole diameter of 70 mm. Three or more points were measured, and it was calculated by their average.

(4) Thicknesses of Surface Cover Layer and Back-Surface Layer

They were measured according to JIS-L-1913-B method. The loads were 20 kPa in the case of the surface cover layer, and 0.02 kPa in the case of the back-surface layer. Three or more points were measured, and they were calculated by their average values.

(5) Basis Weights of Surface Cover Layer and Back-surface Layer

They were measured according to JIS-L-1913.

(6) Thickness of Joining Layer

By a dial gauge, three or more points were measured with a meter diameter of 10 mm, at a final pressure of 0.8 N, and it was calculated by their average value.

(7) Storage Elastic Modulus (G') of Joining Material

For the material used for the joining layer, a sample with a thickness of 500 μm was prepared, the dynamic viscoelasticity was measured using a viscoelasticity measuring device DMA6100 (product name) manufactured by Hitachi High-Tech Science Corporation, and the storage elastic modulus was calculated. The measurement conditions were, while applying a shear strain at a frequency of 1 Hz, the temperature was changed from −80° C. to 80° C. at a heating rate of 5° C./min, the storage elastic modulus (G') was measured, and the value at 25° C. was calculated.

Example 1

(Surface Cover Layer)

As the surface cover layer, a polyester fiber material having an air permeation volume of 21 cm$^3$/cm$^2$·sec, a basis weight of 20 g/m$^2$, an apparent average density of 0.33 g/cm$^3$ and a thickness of 0.06 mm was prepared. In this polyester fiber material, the average fiber diameter of fibers was 3 μm, and the fibers were arranged in the longitudinal direction.

(Back-Surface Layer)

As the back-surface layer, a polyester fiber felt having an air permeation volume of 165 cm$^3$/cm$^2$·sec, a basis weight of 200 g/m$^2$, an average apparent density of 0.02 g/cm$^3$ and a thickness of 10 mm was prepared. In this polyester fiber felt, the average fiber diameter of fibers of this polyester fiber felt was 19 μm.

(Joining Method)

A double-sided pressure-sensitive adhesive tape "No. 5938 Super Butyl Tape" (trade name, substrate: polyethylene net, pressure-sensitive adhesive tape-thickness: 0.5 mm, single-sided separator, storage elastic modulus of pressure-sensitive adhesive: 3.5×10$^5$ Pa) manufactured by Maxell Holdings, Ltd., which used a butyl rubber-based pressure-sensitive adhesive, was cut into bar-like shapes with widths of 5 mm and 6 mm. The felt of the back-surface layer was spread, and the bar-like shaped pressure-sensitive adhesive tapes were arranged in parallel and laminated onto the surface thereof so that a line (a joint portion of the pressure-sensitive adhesive tape)/a space (an opening)/the line/the space/the line=6 mm/5.9 mm/5 mm/5.9 mm/6 mm.

Next, after peeling off the release paper of the pressure-sensitive adhesive tape arranged and laminated onto the back-surface layer, the fiber material of the surface cover layer was spread and placed on it, and both the layers were joined by contact bonding in a normal temperature environment to obtain a soundproof material. As shown in FIG. 1, this soundproof material was cut into a circle with a diameter of 28.8 mm and used for the measurement of the sound absorption coefficient.

The total thickness of the soundproof material obtained was 10.6 mm. In addition, in the measurement sample of the sound absorption coefficient with a diameter of 28.8 mm, a horizontal cross-sectional view showing a joint portion between the surface cover layer and the back-surface layer had a shape as shown in FIG. 2, and the joint area percentage of the joining layer formed by the pressure-sensitive adhesive tape was 52%.

Example 2

A soundproof material was obtained in the same manner as in Example 1, except that the joining method was as follows.

(Joining Method)

A double-sided pressure-sensitive adhesive tape "No. 5938 Super Butyl Tape" (trade name, substrate: polyethylene net, pressure-sensitive adhesive tape-thickness: 0.5 mm, single-sided separator, storage elastic modulus of pressure-sensitive adhesive: 3.5×10$^5$ Pa) manufactured by Maxell Holdings, Ltd., which used a butyl rubber-based pressure-sensitive adhesive, was cut into bar-like shapes with a width of 4.8 mm. The felt of the back-surface layer was spread, and the bar-like shaped pressure-sensitive adhesive tapes were arranged in parallel and laminated onto the surface thereof so that a line (a joint portion of the pressure-sensitive adhesive tape)/a space (an opening)/the line/the space/the line/the space/the line=4.8 mm/2.4 mm/4.8 mm/4.8 mm/4.8 mm/2.4 mm/4.8 mm.

The total thickness of the soundproof material obtained was 10.6 mm. In addition, in the measurement sample of the sound absorption coefficient with a diameter of 28.8 mm, the joint area percentage of the joining layer formed by the pressure-sensitive adhesive tape was 62%.

Example 3

A soundproof material was obtained in the same manner as in Example 1, except that the joining method was as follows.

(Joining Method)

A double-sided pressure-sensitive adhesive tape "No. 5938 Super Butyl Tape" (trade name, substrate: polyethylene net, pressure-sensitive adhesive tape-thickness: 0.5 mm, single-sided separator, storage elastic modulus of pressure-sensitive adhesive: 3.5×10$^5$ Pa) manufactured by Maxell Holdings, Ltd., which used a butyl rubber-based pressure-sensitive adhesive, was cut into bar-like shapes with a width of 4.8 mm. The felt of the back-surface layer was spread, and the bar-like shaped pressure-sensitive adhesive tapes were arranged in parallel and laminated onto the surface thereof so that a line (a joint portion of the pressure-sensitive adhesive tape)/a space (an opening)/the line/the space/the line/the space/the line/the space/the line/=4.8 mm/1.2 mm/4.8 mm/1.2 mm/4.8 mm/1.2 mm/4.8 mm/1.2 mm/4.8 mm.

The total thickness of the soundproof material obtained was 10.6 mm. In addition, in the measurement sample of the sound absorption coefficient with a diameter of 28.8 mm, the joint area percentage of the joining layer formed by the pressure-sensitive adhesive tape was 81%.

Example 4

A soundproof material was obtained in the same manner as in Example 1, except that the joining method was as follows.

(Joining Method)

A double-sided pressure-sensitive adhesive tape "No. 5938 Super Butyl Tape" (trade name, substrate: polyethylene net, pressure-sensitive adhesive tape-thickness: 0.5 mm, single-sided separator, storage elastic modulus of pressure-sensitive adhesive: 3.5×10⁵ Pa) manufactured by Maxell Holdings, Ltd., which used a butyl rubber-based pressure-sensitive adhesive, was cut into bar-like shapes with widths of 6.3 mm and 13.6 mm. The felt of the back-surface layer was spread, and the bar-like shaped pressure-sensitive adhesive tapes were arranged in parallel and laminated onto the surface thereof so that a line (a joint portion of the pressure-sensitive adhesive tape)/a space (an opening)/the line/the space/the line=6.3 mm/1.3 mm/13.6 mm/1.3 mm/6.3 mm.

The total thickness of the soundproof material obtained was 10.6 mm. In addition, in the measurement sample of the sound absorption coefficient with a diameter of 28.8 mm, the joint area percentage of the joining layer formed by the pressure-sensitive adhesive tape was 90%.

Example 5

A soundproof material was obtained in the same manner as in Example 1, except that the joining method was as follows.
(Joining Method)
A double-sided pressure-sensitive adhesive tape "No. 5938 Super Butyl Tape" (trade name, substrate: polyethylene net, pressure-sensitive adhesive tape-thickness: 0.5 mm, single-sided separator, storage elastic modulus of pressure-sensitive adhesive: 3.5×10⁵ Pa) manufactured by Maxell Holdings, Ltd., which used a butyl rubber-based pressure-sensitive adhesive, was cut into bar-like shapes with a width of 13.85 mm. The felt of the back-surface layer was spread, and the bar-like shaped pressure-sensitive adhesive tapes were arranged in parallel and laminated onto the surface thereof so that a line (a joint portion of the pressure-sensitive adhesive tape)/a space (an opening)/the line=13.85 mm/1.1 mm/13.85 mm.

The total thickness of the soundproof material obtained was 10.6 mm. In addition, in the measurement sample of the sound absorption coefficient with a diameter of 28.8 mm, the joint area percentage of the joining layer formed by the pressure-sensitive adhesive tape was 95%.

Example 6

A soundproof material was obtained in the same manner as in Example 1, except that the back-surface layer was as follows.
(Back-Surface Layer)
As the back-surface layer, a polyurethane foam material having open cells with an air permeation volume of cm³/cm²·sec, a basis weight of 250 g/m², an average apparent density of 0.03 g/cm³ and a thickness of 10 mm was prepared.

The total thickness of the soundproof material obtained was 10.6 mm. In addition, in the measurement sample of the sound absorption coefficient with a diameter of 28.8 mm, the joint area percentage of the joining layer formed by the pressure-sensitive adhesive tape was 52%.

Example 7

A soundproof material was obtained in the same manner as in Example 1, except that the surface cover layer was as follows.
(Surface Cover layer)
As the surface cover layer, an acrylic/polyester mixed fiber material having an average fiber diameter of 10 μm, an air permeation volume of 80 cm³/cm²·sec, a basis weight of 94 g/m², an average apparent density of 0.02 g/cm³ and a thickness of 4 mm was prepared. In this acrylic/polyester mixed fiber material, the mixing ratio of acrylic fiber and polyester fiber was acrylic fiber/polyester fiber=63/37 (mass ratio), and the arrangement of fibers was random. The average fiber diameter of fibers of the acrylic/polyester mixed fiber material was 10 μm.

The total thickness of the soundproof material obtained was 14.5 mm. In addition, in the measurement sample of the sound absorption coefficient with a diameter of 28.8 mm, the joint area percentage of the joining layer formed by the pressure-sensitive adhesive tape was 52%.

Example 8

A soundproof material was obtained in the same manner as in Example 2, except that the surface cover layer was as follows.
(Surface Cover Layer)
As the surface cover layer, an acrylic/polyester mixed fiber material having an air permeation volume of 80 cm³/cm²·sec, a basis weight of 94 g/m², an average apparent density of 0.02 g/cm³ and a thickness of 4 mm was prepared. In this acrylic/polyester mixed fiber material, the mixing ratio of acrylic fiber and polyester fiber was acrylic fiber/polyester fiber=63/37 (mass ratio), and the arrangement of fibers was random. The average fiber diameter of fibers of the acrylic/polyester mixed fiber material was 10 μm.

The total thickness of the soundproof material obtained was 14.5 mm. In addition, in the measurement sample of the sound absorption coefficient with a diameter of 28.8 mm, the joint area percentage of the joining layer formed by the pressure-sensitive adhesive tape was 62%.

Example 9

A soundproof material was obtained in the same manner as in Example 3, except that the surface cover layer was as follows.
(Surface Cover Layer)
As the surface cover layer, an acrylic/polyester mixed fiber material having an air permeation volume of 80 cm³/cm²·sec, a basis weight of 94 g/m², an average apparent density of 0.02 g/cm³ and a thickness of 4 mm was prepared. In this acrylic/polyester mixed fiber material, the mixing ratio of acrylic fiber and polyester fiber was acrylic fiber/polyester fiber=63/37 (mass ratio), and the arrangement of fibers was random. The average fiber diameter of fibers of the acrylic/polyester mixed fiber material was 10 μm.

The total thickness of the soundproof material obtained was 14.5 mm. In addition, in the measurement sample of the sound absorption coefficient with a diameter of 28.8 mm, the joint area percentage of the joining layer formed by the pressure-sensitive adhesive tape was 81%.

Example 10

A soundproof material was obtained in the same manner as in Example 3, except that the back-surface layer was as follows.
(Back-Surface Layer)
As the back-surface layer, a polyester fiber felt having an air permeation volume of 265 cm³/cm²·sec, a basis weight of 100 g/m², an average apparent density of 0.02 g/cm³ and a thickness of 5 mm was prepared. The average fiber diameter of fibers of this polyester fiber felt was 19 μm.

The total thickness of the soundproof material obtained was 5.6 mm. In addition, in the measurement sample of the sound absorption coefficient with a diameter of 28.8 mm, the joint area percentage of the joining layer formed by the pressure-sensitive adhesive tape was 81%.

Example 11

A soundproof material was obtained in the same manner as in Example 1, except that the back-surface layer was as follows.

(Back-Surface Layer)

As the back-surface layer, a polyester fiber felt having an air permeation volume of 113 $cm^3/cm^2 \cdot sec$, a basis weight of 280 $g/m^2$, an average apparent density of 0.02 $g/cm^3$ and a thickness of 14 mm was prepared. The average fiber diameter of fibers of this polyester fiber felt was 19 μm.

The total thickness of the soundproof material obtained was 14.6 mm. In addition, in the measurement sample of the sound absorption coefficient with a diameter of 28.8 mm, the joint area percentage of the joining layer formed by the pressure-sensitive adhesive tape was 52%.

Example 12

A soundproof material was obtained in the same manner as in Example 2, except that the back-surface layer was as follows.

(Back-Surface Layer)

As the back-surface layer, a polyester fiber felt having an air permeation volume of 113 $cm^3/cm^2 \cdot sec$, a basis weight of 280 $g/m^2$, an average apparent density of 0.02 $g/cm^3$ and a thickness of 14 mm was prepared. The average fiber diameter of fibers of this polyester fiber felt was 19 μm.

The total thickness of the soundproof material obtained was 14.6 mm. In addition, in the measurement sample of the sound absorption coefficient with a diameter of 28.8 mm, the joint area percentage of the joining layer formed by the pressure-sensitive adhesive tape was 62%.

Example 13

A soundproof material was obtained in the same manner as in Example 1, except that the surface cover layer was as follows.

(Surface Cover Layer)

As the surface cover layer, an acrylic/polyester mixed fiber material having an air permeation volume of 9 $cm^3/cm^2 \cdot sec$, a basis weight of 60 $g/m^2$, an average apparent density of 0.12 $g/cm^3$ and a thickness of 0.5 mm was prepared. In this acrylic/polyester mixed fiber material, the mixing ratio of acrylic fiber and polyester fiber was acrylic fiber/polyester fiber=80/20 (mass ratio), and the arrangement of fibers was random. The average fiber diameter of fibers of the acrylic/polyester mixed fiber material was 6 μm.

The total thickness of the soundproof material obtained was 11.0 mm. In addition, in the measurement sample of the sound absorption coefficient with a diameter of 28.8 mm, the joint area percentage of the joining layer formed by the pressure-sensitive adhesive tape was 52%.

Example 14

A soundproof material was obtained in the same manner as in Example 3, except that the surface cover layer was as follows.

(Surface Cover Layer)

As the surface cover layer, a polyester fiber material having an air permeation volume of 190 $cm^3/cm^2 \cdot sec$, a basis weight of 85 $g/m^2$, an average apparent density of 0.14 $g/cm^3$ and a thickness of 0.6 mm was prepared. In this polyester fiber material, the arrangement of fibers was random. The average fiber diameter of fibers of the polyester fiber material was 10 μm.

The total thickness of the soundproof material obtained was 11.1 mm. In addition, in the measurement sample of the sound absorption coefficient with a diameter of 28.8 mm, the joint area percentage of the joining layer formed by the pressure-sensitive adhesive tape was 81%.

Example 15

A soundproof material was obtained in the same manner as in Example 2, except that the joining method was as follows.

(Joining Method)

A double-sided pressure-sensitive adhesive tape "KF4 #100" (trade name, substrate: none, pressure-sensitive adhesive tape-thickness: 0.1 mm, with a double-sided separator, storage elastic modulus of pressure-sensitive adhesive: 1.1× $10^5$ Pa) manufactured by New Tac Kasei Co., Ltd., which used an acrylic-based pressure-sensitive adhesive, was cut into bar-like shapes with a width of 4.8 mm. The felt of the back-surface layer was spread, and the bar-like shaped pressure-sensitive adhesive tapes, each with a PET separator on the light-peeling side peeled off, were arranged in parallel and laminated onto the surface thereof so that a line (a joint portion of the pressure-sensitive adhesive tape)/a space (an opening)/the line/the space/the line/the space/the line=4.8 mm/2.4 mm/4.8 mm/4.8 mm/4.8 mm/2.4 mm/4.8 mm.

Then, after peeling off the PET separator on the heavy-peeling side of the pressure-sensitive adhesive tape arranged and laminated onto the back-surface layer, the fiber material of the surface cover layer was spread and placed on it, and both the layers were joined by contact bonding in a normal temperature environment to obtain a soundproof material.

The total thickness of the soundproof material obtained was 10.2 mm. In addition, in the measurement sample of the sound absorption coefficient with a diameter of 28.8 mm, the joint area percentage of the joining layer formed by the pressure-sensitive adhesive tape was 62%.

Example 16

A soundproof material was obtained in the same manner as in Example 2, except that the joining method was as follows.

(Joining Method)

A double-sided pressure-sensitive adhesive tape "No. 5933 Super Butyl Tape" (trade name, substrate: polyethylene net, pressure-sensitive adhesive tape-thickness: 3.0 mm, single-sided separator, storage elastic modulus of pressure-sensitive adhesive: 3.6×$10^5$ Pa) manufactured by Maxell Holdings, Ltd., which used a butyl rubber-based pressure-sensitive adhesive, was cut into bar-like shapes with a width of 4.8 mm. The felt of the back-surface layer was spread, and the bar-like shaped pressure-sensitive adhesive tapes were arranged in parallel and laminated onto the surface thereof so that a line (a joint portion of the pressure-sensitive adhesive tape)/a space (an opening)/the line/the space/the line/the space/the line=4.8 mm/2.4 mm/4.8 mm/4.8 mm/4.8 mm/2.4 mm/4.8 mm.

The total thickness of the soundproof material obtained was 12.1 mm. In addition, in the measurement sample of the sound absorption coefficient with a diameter of 28.8 mm, the joint area percentage of the joining layer formed by the pressure-sensitive adhesive tape was 62%.

Example 17

A soundproof material was obtained in the same manner as in Example 8, except that the back-surface layer and the joining layer were as follows.
(Back-Surface Layer)
As the back-surface layer, a polyester fiber felt having an air permeation volume of 110 cm$^3$/cm$^2$·sec, a basis weight of 300 g/m$^2$, an average apparent density of 0.02 g/cm$^3$ and a thickness of 15 mm was prepared. The average fiber diameter of fibers of this polyester fiber felt was 19 μm.
(Joining Layer)
A double-sided pressure-sensitive adhesive tape "No. 5933 Super Butyl Tape" (trade name, substrate: polyethylene net, pressure-sensitive adhesive tape-thickness: 3.0 mm, single-sided separator, storage elastic modulus of pressure-sensitive adhesive: 3.6×10$^5$ Pa) manufactured by Maxell Holdings, Ltd., which used a butyl rubber-based pressure-sensitive adhesive, was prepared.

The total thickness of the soundproof material obtained was 22.0 mm. In addition, in the measurement sample of the sound absorption coefficient with a diameter of 28.8 mm, the joint area percentage of the joining layer formed by the pressure-sensitive adhesive tape was 62%.

Comparative Example 1

A soundproof material was obtained in the same manner as in Example 1, except that no surface cover layer and no joining layer were used.

Comparative Example 2

A soundproof material was obtained in the same manner as in Example 3, except that the surface cover layer was as follows.
(Surface Cover Layer)
As the surface cover layer, a polyester fiber material having an air permeation volume of 197 cm$^3$/cm$^2$·sec, a basis weight of 85 g/m$^2$, an apparent average density of 0.14 g/cm$^3$ and a thickness of 0.6 mm was prepared. The average fiber diameter of fibers of the polyester fiber material was 17 μm.

The total thickness of the soundproof material obtained was 11.1 mm. In addition, in the measurement sample of the sound absorption coefficient with a diameter of 28.8 mm, the joint area percentage of the joining layer formed by the pressure-sensitive adhesive tape was 81%.

Comparative Example 3

A soundproof material was obtained in the same manner as in Example 3, except that the surface cover layer was as follows.
(Surface Cover Layer)
As the surface cover layer, a closed cell type polyethylene foam material having an air permeation volume of 0.2 cm$^3$/cm$^2$·sec, a basis weight of 66 g/m$^2$, an apparent average density of 0.03 g/cm$^3$ and a thickness of 2 mm.

The total thickness of the soundproof material obtained was 12.5 mm. In addition, in the measurement sample of the sound absorption coefficient with a diameter of 28.8 mm, the joint area percentage of the joining layer formed by the pressure-sensitive adhesive tape was 81%.

Comparative Example 4

A soundproof material was obtained in the same manner as in Example 3, except that the joining method was as follows.
(Joining Method)
A double-sided pressure-sensitive adhesive tape "No. 5938 Super Butyl Tape" (trade name, substrate: polyethylene net, pressure-sensitive adhesive tape-thickness: 0.5 mm, single-sided separator, storage elastic modulus of pressure-sensitive adhesive: 3.5×10$^5$ Pa) manufactured by Maxell Holdings, Ltd., which used a butyl rubber-based pressure-sensitive adhesive, was cut into a size of 100 mm×100 mm. The felt of the back-surface layer was spread, and the pressure-sensitive adhesive tape was placed and laminated on the surface thereof.

Next, after peeling off the release paper of the pressure-sensitive adhesive tape arranged and laminated onto the back-surface layer, the fiber material of the surface cover layer was spread and placed on it, and both the layers were joined by contact bonding in a normal temperature environment to obtain a soundproof material. In this soundproof material, a portion where all the surfaces of the surface cover layer and the back-surface layer are joined by the joining tape was cut into a circle with a diameter of 28.8 mm and used for the measurement of the sound absorption coefficient.

The total thickness of the soundproof material obtained was 10.6 mm. In addition, in the measurement sample of the sound absorption coefficient with a diameter of 28.8 mm, the joint area percentage of the joining layer formed by the pressure-sensitive adhesive tape was 100%.

Comparative Example 5

A soundproof material was obtained in the same manner as in Example 1, except that the joining method was as follows.
(Joining Method)
A double-sided pressure-sensitive adhesive tape "No. 5938 Super Butyl Tape" (trade name, substrate: polyethylene net, pressure-sensitive adhesive tape-thickness: 0.5 mm, single-sided separator, storage elastic modulus of pressure-sensitive adhesive: 3.5×10$^5$ Pa) manufactured by Maxell Holdings, Ltd., which used a butyl rubber-based pressure-sensitive adhesive, was cut into bar-like shapes with a width of 4.8 mm. The felt of the back-surface layer was spread, and the bar-like shaped pressure-sensitive adhesive tapes were arranged in parallel and laminated onto the surface thereof so that a line (a joint portion of the pressure-sensitive adhesive tape)/a space (an opening)/the line/the space/the line=4.8 mm/7.2 mm/4.8 mm/7.2 mm/4.8 mm.

The total thickness of the soundproof material obtained was 10.6 mm. In addition, in the measurement sample of the sound absorption coefficient with a diameter of 28.8 mm, the joint area percentage of the joining layer formed by the pressure-sensitive adhesive tape was 43%.

Comparative Example 6

Instead of joining the surface cover layer and the back-surface layer used in Example 1 by the pressure-sensitive adhesive, they were simply superposed and served as a soundproof material. The total thickness of the soundproof material was 10.1 mm. In addition, in the measurement sample of the sound absorption coefficient with a diameter of 28.8 mm, the joint area percentage of the joining layer formed by the pressure-sensitive adhesive tape was 0%.

Regarding the respective soundproof materials of Examples 1 to 17, and Comparative Examples 1 to 6, the measurement results of the normal incidence sound absorption coefficient were shown in Tables 1 to 4.

TABLE 1

| | | | Example 1 | Example 2 | Example 3 | Example 4 | Example 5 | Example 6 |
|---|---|---|---|---|---|---|---|---|
| Surface cover layer | Material | | Polyester fiber material | Polyester fiber material | Polyester fiber material | Polyester fiber material | Polyester fiber material | Polyester fiber material |
| | Average fiber diameter | (μm) | 3 | 3 | 3 | 3 | 3 | 3 |
| | Air permeation volume | ($cm^3/cm^2 \cdot sec$) | 21 | 21 | 21 | 21 | 21 | 21 |
| | Basis weight | ($g/m^2$) | 20 | 20 | 20 | 20 | 20 | 20 |
| | Thickness | (mm) | 0.06 | 0.06 | 0.06 | 0.06 | 0.06 | 0.06 |
| | Average apparent density | ($g/cm^3$) | 0.33 | 0.33 | 0.33 | 0.33 | 0.33 | 0.33 |
| Joining layer | Material | | Butyl rubber-based double-sided pressure-sensitive adhesive tape | Butyl rubber-based double-sided pressure-sensitive adhesive tape | Butyl rubber-based double-sided pressure-sensitive adhesive tape | Butyl rubber-based double-sided pressure-sensitive adhesive tape | Butyl rubber-based double-sided pressure-sensitive adhesive tape | Butyl rubber-based double-sided pressure-sensitive adhesive tape |
| | Thickness | (mm) | 0.5 | 0.5 | 0.5 | 0.5 | 0.5 | 0.5 |
| | Joint area percentage | (%) | 52 | 62 | 81 | 90 | 95 | 52 |
| | Storage elastic modulus | Pa | $3.5 \times 10^5$ | $3.5 \times 10^5$ | $3.5 \times 10^5$ | $3.5 \times 10^5$ | $3.5 \times 10^5$ | $3.5 \times 10^5$ |
| Back-surface layer | Material | | Polyester fiber felt | Polyester fiber felt | Polyester fiber felt | Polyester fiber felt | Polyester fiber felt | Polyurethane-based foam |
| | Average fiber diameter | (μm) | 19 | 19 | 19 | 19 | 19 | — |
| | Air permeation volume | ($cm^3/cm^2 \cdot sec$) | 165 | 165 | 165 | 165 | 165 | 32 |
| | Basis weight | ($g/m^2$) | 200 | 200 | 200 | 200 | 200 | 250 |
| | Thickness | (mm) | 10 | 10 | 10 | 10 | 10 | 10 |
| | Average apparent density | ($g/cm^3$) | 0.02 | 0.02 | 0.02 | 0.02 | 0.02 | 0.03 |
| Soundproof material | Total thickness | (mm) | 10.6 | 10.6 | 10.6 | 10.6 | 10.6 | 10.6 |
| | Normal incidence sound absorption coefficient (%) | ⅓ Octave band center frequency 1000 Hz | 27 | 28 | 32 | 32 | 32 | 18 |
| | | 1250 Hz | 30 | 32 | 47 | 48 | 49 | 28 |
| | | 1600 Hz | 44 | 46 | 56 | 66 | 72 | 42 |
| | | 2000 Hz | 58 | 62 | 75 | 85 | 90 | 68 |
| | | 2500 Hz | 85 | 87 | 96 | 92 | 90 | 97 |
| | | 3150 Hz | 97 | 97 | 90 | 80 | 74 | 96 |
| | | 4000 Hz | 99 | 99 | 78 | 65 | 59 | 82 |
| Evaluation | | | B | B | A | A | A | B |

TABLE 2

| | | | Example 7 | Example 8 | Example 9 | Example 10 | Example 11 | Example 12 |
|---|---|---|---|---|---|---|---|---|
| Surface cover layer | Material | | Acrylic/polyester mixed fiber material | Acrylic/polyester mixed fiber material | Acrylic/polyester mixed fiber material | Polyester fiber material | Polyester fiber material | Polyester fiber material |
| | Average fiber diameter | (μm) | 10 | 10 | 10 | 3 | 3 | 3 |
| | Air permeation volume | ($cm^3/cm^2 \cdot sec$) | 80 | 80 | 80 | 21 | 21 | 21 |
| | Basis weight | ($g/m^2$) | 94 | 94 | 94 | 20 | 20 | 20 |
| | Thickness | (mm) | 4 | 4 | 4 | 0.06 | 0.06 | 0.06 |
| | Average apparent density | ($g/cm^3$) | 0.02 | 0.02 | 0.02 | 0.33 | 0.33 | 0.33 |
| Joining layer | Material | | Butyl rubber-based double-sided pressure-sensitive adhesive tape | Butyl rubber-based double-sided pressure-sensitive adhesive tape | Butyl rubber-based double-sided pressure-sensitive adhesive tape | Butyl rubber-based double-sided pressure-sensitive adhesive tape | Butyl rubber-based double-sided pressure-sensitive adhesive tape | Butyl rubber-based double-sided pressure-sensitive adhesive tape |
| | Thickness | (mm) | 0.5 | 0.5 | 0.5 | 0.5 | 0.5 | 0.5 |
| | Joint area percentage | (%) | 52 | 62 | 81 | 81 | 52 | 62 |
| | Storage elastic modulus | Pa | $3.5 \times 10^5$ | $3.5 \times 10^5$ | $3.5 \times 10^5$ | $3.5 \times 10^5$ | $3.5 \times 10^5$ | $3.5 \times 10^5$ |
| Back-surface layer | Material | | Polyester fiber felt | Polyester fiber felt | Polyester fiber felt | Polyester fiber felt | Polyester fiber felt | Polyester fiber felt |
| | Average fiber diameter | (μm) | 19 | 19 | 19 | 19 | 19 | 19 |
| | Air permeation volume | ($cm^3/cm^2 \cdot sec$) | 165 | 165 | 165 | 265 | 113 | 113 |
| | Basis weight | ($g/m^2$) | 200 | 200 | 200 | 100 | 280 | 280 |
| | Thickness | (mm) | 10 | 10 | 10 | 5 | 14 | 14 |
| | Average apparent density | ($g/cm^3$) | 0.02 | 0.02 | 0.02 | 0.02 | 0.02 | 0.02 |

TABLE 2-continued

|  |  |  | Example 7 | Example 8 | Example 9 | Example 10 | Example 11 | Example 12 |
|---|---|---|---|---|---|---|---|---|
| Sound-proof material | Total thickness | (mm) | 14.5 | 14.5 | 14.5 | 5.6 | 14.6 | 14.6 |
|  | Normal incidence sound absorption coefficient (%) | 1/3 Octave band center frequency | | | | | | |
|  |  | 1000 Hz | 25 | 26 | 28 | 17 | 34 | 44 |
|  |  | 1250 Hz | 37 | 40 | 38 | 26 | 41 | 59 |
|  |  | 1600 Hz | 49 | 53 | 51 | 41 | 47 | 69 |
|  |  | 2000 Hz | 68 | 70 | 69 | 64 | 74 | 78 |
|  |  | 2500 Hz | 83 | 84 | 84 | 80 | 95 | 91 |
|  |  | 3150 Hz | 94 | 95 | 95 | 79 | 100 | 99 |
|  |  | 4000 Hz | 99 | 99 | 97 | 73 | 95 | 92 |
| Evaluation | | | B | B | B | B | B | A |

TABLE 3

|  |  |  | Example 13 | Example 14 | Example 15 | Example 16 | Example 17 | Comp. Example 1 |
|---|---|---|---|---|---|---|---|---|
| Surface cover layer | Material | | Acrylic/polyester mixed fiber material | Polyester fiber material | Polyester fiber material | Polyester fiber material | Acrylic/polyester mixed fiber material | — |
|  | Average fiber diameter | (μm) | 6 | 10 | 3 | 3 | 10 | — |
|  | Air permeation volume | (cm³/cm² · sec) | 9 | 190 | 21 | 21 | 80 | — |
|  | Basis weight | (g/m²) | 60 | 85 | 20 | 20 | 94 | 1 |
|  | Thickness | (mm) | 0.5 | 0.6 | 0.06 | 0.06 | 4 | 1 |
|  | Average apparent density | (g/cm³) | 0.12 | 0.14 | 0.33 | 0.33 | 0.02 | — |
| Joining layer | Material | | Butyl rubber-based double-sided pressure-sensitive adhesive tape | Butyl rubber-based double-sided pressure-sensitive adhesive tape | Acrylic-based double-sided pressure-sensitive adhesive tape | Butyl rubber-based double-sided pressure-sensitive adhesive tape | Butyl rubber-based double-sided pressure-sensitive adhesive tape | — |
|  | Thickness | (mm) | 0.5 | 0.5 | 0.1 | 3 | 3 | — |
|  | Joint area percentage | (%) | 52 | 81 | 62 | 62 | 62 | — |
|  | Storage elastic modulus | Pa | 3.5 × 10⁵ | 3.5 × 10⁵ | 1.1 × 10⁵ | 3.6 × 10⁵ | 3.6 × 10⁵ | — |
| Back-surface layer | Material | | Polyester fiber felt | Polyester fiber felt | Polyester fiber felt | Polyester fiber felt | Polyester fiber felt | Polyester fiber felt |
|  | Average fiber diameter | (μm) | 19 | 19 | 19 | 19 | 19 | 19 |
|  | Air permeation volume | (cm³/cm² · sec) | 165 | 165 | 165 | 165 | 110 | 165 |
|  | Basis weight | (g/m²) | 200 | 200 | 200 | 200 | 300 | 200 |
|  | Thickness | (mm) | 10 | 10 | 10 | 10 | 15 | 10 |
|  | Average apparent density | (g/cm³) | 0.02 | 0.02 | 0.02 | 0.02 | 0.02 | 0.02 |
| Sound-proof material | Total thickness | (mm) | 11 | 11.1 | 10.2 | 12.1 | 22 | 10 |
|  | Normal incidence sound absorption coefficient (%) | 1/3 Octave band center frequency | | | | | | |
|  |  | 1000 Hz | 23 | 19 | 29 | 32 | 50 | 10 |
|  |  | 1250 Hz | 30 | 28 | 35 | 39 | 65 | 12 |
|  |  | 1600 Hz | 44 | 38 | 49 | 61 | 78 | 13 |
|  |  | 2000 Hz | 64 | 55 | 69 | 73 | 87 | 15 |
|  |  | 2500 Hz | 78 | 70 | 93 | 94 | 96 | 18 |
|  |  | 3150 Hz | 80 | 85 | 99 | 99 | 99 | 23 |
|  |  | 4000 Hz | 80 | 98 | 100 | 97 | 97 | 28 |
| Evaluation | | | B | B | B | A | A | C |

TABLE 4

|  |  |  | Comp. Example 2 | Comp. Example 3 | Comp. Example 4 | Comp. Example 5 | Comp. Example 6 |
|---|---|---|---|---|---|---|---|
| Surface cover layer | Material | | Polyester fiber material | Polyethylene foam material | Polyester fiber material | Polyester fiber material | Polyester fiber material |
|  | Average fiber diameter | (μm) | 17 | — | 3 | 3 | 3 |
|  | Air permeation volume | (cm³/cm² · sec) | 197 | 0.2 | 21 | 21 | 21 |
|  | Basis weight | (g/m²) | 85 | 66 | 20 | 20 | 20 |
|  | Thickness | (mm) | 0.6 | 2 | 0.06 | 0.06 | 0.06 |
|  | Average apparent density | (g/cm³) | 0.14 | 0.03 | 0.33 | 0.33 | 0.33 |

TABLE 4-continued

| | | | Comp. Example 2 | Comp. Example 3 | Comp. Example 4 | Comp. Example 5 | Comp. Example 6 |
|---|---|---|---|---|---|---|---|
| Joining layer | Material | | Butyl rubber-based double-sided pressure-sensitive adhesive tape | Butyl rubber-based double-sided pressure-sensitive adhesive tape | Butyl rubber-based double-sided pressure-sensitive adhesive tape | Butyl rubber-based double-sided pressure-sensitive adhesive tape | Butyl rubber-based double-sided pressure-sensitive adhesive tape |
| | Thickness | (mm) | 0.5 | 0.5 | 0.5 | 0.5 | — |
| | Joint area percentage | (%) | 81 | 81 | 100 | 43 | 0 |
| | Storage elastic modulus | Pa | 3.5 × 10⁵ | 3.5 × 10⁵ | 3.5 × 10⁵ | 3.5 × 10⁵ | — |
| Back-surface layer | Material | | Polyester fiber felt | Polyester fiber felt | Polyester fiber felt | Polyester fiber felt | Polyester fiber felt |
| | Average fiber diameter | (μm) | 19 | 19 | 19 | 19 | 19 |
| | Air permeation volume | (cm³/cm²·sec) | 165 | 165 | 165 | 165 | 165 |
| | Basis weight | (g/m²) | 200 | 200 | 200 | 200 | 200 |
| | Thickness | (mm) | 10 | 10 | 10 | 10 | 10 |
| | Average apparent density | (g/cm³) | 0.02 | 0.02 | 0.02 | 0.02 | 0.02 |
| Soundproof material | Total thickness | (mm) | 11.1 | 12.5 | 10.6 | 10.6 | 10.1 |
| | Normal incidence sound absorption coefficient (%) | 1/3 Octave band center frequency 1000 Hz | 17 | 52 | 40 | 17 | 14 |
| | | 1250 Hz | 22 | 29 | 62 | 22 | 18 |
| | | 1600 Hz | 30 | 17 | 82 | 27 | 25 |
| | | 2000 Hz | 43 | 13 | 78 | 40 | 37 |
| | | 2500 Hz | 61 | 11 | 64 | 61 | 55 |
| | | 3150 Hz | 81 | 12 | 48 | 82 | 76 |
| | | 4000 Hz | 96 | 10 | 36 | 96 | 88 |
| Evaluation | | | C | C | C | C | C |

As is apparent from Tables 1 to 3, it can be seen that, although all the soundproof materials of Examples 1 to 17 of the present invention are thin, having total thicknesses in the range of 5 to 23 mm, the normal incidence sound absorption coefficients are 55% or more at all 1/3 octave band center frequencies 2000, 2500, 3150 and 4000 Hz, which are practically useful high levels, and that, in particular, Examples 3 to 5, Examples 12, 13 and Example 17 also have expanded sound absorption frequency ranges that are useful for the sound absorbing materials.

The examples will hereinafter be compared in detail. It can be seen that, in Examples 1 to 5, Examples 3 to 5 in which the joint area percentage is 81 to 95% have more expanded sound absorption frequency ranges that are useful for the sound absorbing materials (the frequency range in which the normal incidence sound absorption coefficient is 55% or more), by comparison with Examples 1 and 2 in which the joint area percentage is 52 to 62%. Furthermore, Example 2 in which the joint area percentage is 62% has an overall higher, though slightly, sound absorption coefficient, by comparison with Example 1 in which the joint area percentage is 52%.

Comparing Example 6 in which the material of the back-surface layer is a polyurethane-based foam and Example 1 in which the material of the back-surface layer is a polyester fiber felt, it can be seen that, whether the material of the back-surface layer is a foam material having open cells or a fiber material, both of them ensure a sound absorption frequency range that is useful for the sound absorbing materials (the frequency range in which the normal incidence sound absorption coefficient is 55% or more).

Also when comparing Example 11 and Example 12, it can be seen that Example 12 in which the joint area percentage is 62% has a more expanded sound absorption frequency range that is useful for the sound absorbing material (the frequency range in which the normal incidence sound absorption coefficient is 55% or more) than Example 11 in which the joint area percentage is 52%.

It can also be seen that Example 1 in which the air permeation volume of the surface cover layer is 21 cm³/cm²·sec and the joint area percentage is 52% and Example 7 in which the air permeation volume of the surface cover layer is 80 cm³/cm²·sec and the joint area percentage is 52% have relatively higher sound absorption coefficients by comparison with Example 13 in which the air permeation volume of the surface cover layer is 9 cm³/cm²·sec and the joint area percentage is 52%. Similarly, Example 3 in which the air permeation volume of the surface cover layer is 21 cm³/cm²·sec, and the joint area percentage is 81%, and Example 9 in which the air permeation volume of the surface cover layer is 80 cm³/cm²·sec, and the joint area percentage is 81% have relatively higher sound absorption coefficients, by comparison with Example 14 in which the air permeation volume of the surface cover layer is 190 cm³/cm²·sec, and the joint area percentage is 81%.

Furthermore, it can be seen that Example 3 in which the basis weight of the back-surface layer is 200 g/m², and the joint area percentage is 81% has a relatively higher sound absorption coefficient, and also has an expanded sound absorption frequency range that is useful for the soundproof material (the frequency range in which the normal incidence sound absorption coefficient is 55% or more), by comparison with Example 10 in which the basis weight of the back-surface layer is 100 g/m², and the joint area percentage is 81%. Similarly, it can be seen that Example 11 in which the basis weight of the back-surface layer 280 g/m², and the joint area percentage is 52%, and Example 12 in which the basis weight of the back-surface layer is 280 g/m², and the joint area percentage is 62% have relatively higher sound absorption coefficients, by comparison with Example 1 in which the basis weight of the back-surface layer is 200 g/m², and the joint area percentage is 52%, and Example 2 in which the basis of the back-surface layer is 200 g/m², and the joint area percentage is 62%, and that in particular Example 12 also has an expanded sound absorption frequency range that is useful for the soundproof material (the frequency range in which the normal incidence sound absorption coefficient is 55% or more).

Furthermore, it can be seen that Examples 2, 15 and 16 in which the joint area percentage is 62%, and the type and thickness of the joining material are changed all show good sound absorption characteristics, and that, in particular, Example 16 in which the thickness of the joining material is 3 mm also has a more expanded sound absorption frequency range that is useful for the sound absorbing material (the frequency range in which the normal incidence sound absorption coefficient is 55% or more).

Furthermore, it can be seen that Example 17 in which the thickness of the joining material is 3 mm, and the thickness of the back-surface layer is 15 mm also has a relatively good sound absorption frequency range that is useful for the soundproof material (the frequency range in which the normal incidence sound absorption coefficient is 55% or more), by comparison with Example 8 in which the thickness of the joining material is 0.5 mm, and the thickness of the back-surface layer is 10 mm due to the effect of the increased thicknesses of the joining material and the back-surface layer. Therefore, if the total thickness of the applied soundproof material may exceed 15 mm, for example, the configuration of Example 17 may be selected, and if the total thickness of the applied soundproof material of 15 mm or less is desired, for example, the configuration of Example 8, or the configurations of Examples 1 to 7 and Examples 9 to 16 may be selected.

On the other hand, as is apparent from Tables 3 to 4, it can be seen that the soundproof materials of Comparative Examples 1 to 6 that do not satisfy the claims of the present invention all have relatively low sound absorption coefficients, and also have narrow sound absorption frequency ranges that are useful for the soundproof materials (the frequency range in which the normal incidence sound absorption coefficient is 55% or more) or have poor balances in the low to high frequency ranges, by comparison with Examples 1 to 17.

INDUSTRIAL APPLICABILITY

The present invention can provide a soundproof material having a practically useful high-level sound absorption coefficient while maintaining thinness, and further having an expanded sound-absorbable frequency region.

10, 20 soundproof material
11 surface cover layer
12 joining layer
13 back-surface layer
14 air-permeable opening

What is claimed is:
1. A soundproof material comprising:
a surface cover layer composed of a fiber material;
a back-surface layer laminated onto the surface cover layer, and composed of a porous material with voids interconnected with each other; and
a joining layer laminated between the surface cover layer and the back-surface layer, and composed of a joining material,
wherein:
the fiber material has an average fiber diameter of 1 to 10 μm and an air-permeation volume of 5 to 200 $cm^3/cm^2 \cdot sec$,
the joining layer has a joint area percentage of 50 to 95% with respect to an entire surface where the surface cover layer and the back-surface layer face each other, and
the surface cover layer has a basis weight from 5 to 300 $g/m^2$.

2. The soundproof material according to claim 1, wherein the joining layer has a joint area percentage of 60 to 95% with respect to the entire surface where the surface cover layer and the back-surface layer face each other.

3. The soundproof material according to claim 1, wherein the joining material is a coated pressure-sensitive adhesive or double-sided pressure-sensitive adhesive tape.

4. The soundproof material according to claim 3, wherein the coated pressure-sensitive adhesive or double-sided pressure-sensitive adhesive has a shear storage elastic modulus in the range of $1.0 \times 10^4$ to $1.0 \times 10^6$ Pa at 25° C.

5. The soundproof material according to claim 1, wherein the joining layer has a plurality of bar-like shaped layers.

6. The soundproof material according to claim 5, wherein the plurality of bar-like shaped layers forms a stripe pattern.

7. The soundproof material according to claim 6, wherein the distance between adjacent bar-like shaped layers is 1 mm or more.

8. The soundproof material according to claim 1, wherein the surface cover layer has an air-permeation volume of 10 to 100 $cm^3/cm^2 \cdot sec$.

9. The soundproof material according to claim 1, wherein the back-surface layer is a fiber material, and the fiber material has a basis weight of 100 to 300 $g/m^2$.

10. The soundproof material according to claim 1, wherein the soundproof material has a total thickness of 5 to 15 mm.

11. The soundproof material according to claim 1, wherein the soundproof material has a normal incidence sound absorption coefficient of 55% or more at all ⅓ octave band center frequencies 2000, 2500, 3150 and 4000 Hz as measured according to JIS A1405-2.

12. The soundproof material according to claim 1, wherein the soundproof material has a normal incidence sound absorption coefficient of 55% or more at all ⅓ octave band center frequencies 1600, 2000, 2500, 3150 and 4000 Hz as measured according to JIS A1405-2.

13. The soundproof material according to claim 1, wherein the soundproof material has a normal incidence sound absorption coefficient of 55% or more at all ⅓ octave band center frequencies 1250, 1600, 2000, 2500, 3150 and 4000 Hz as measured according to JIS A1405-2.

* * * * *